(12) United States Patent
Eromaki

(10) Patent No.: US 7,515,930 B2
(45) Date of Patent: Apr. 7, 2009

(54) ELECTRONIC DEVICE SLIDING MECHANISM

(75) Inventor: Marko Eromaki, Tampere (FI)

(73) Assignee: Nokia Corporation, Espoo (FI)

( * ) Notice: Subject to any disclaimer, the term of this patent is extended or adjusted under 35 U.S.C. 154(b) by 396 days.

(21) Appl. No.: 11/440,710

(22) Filed: May 24, 2006

(65) Prior Publication Data

US 2007/0273293 A1   Nov. 29, 2007

(51) Int. Cl.
*H04M 1/00* (2006.01)
(52) U.S. Cl. ............... 455/550.1; 455/347; 455/575.1; 455/575.4; 379/433.12
(58) Field of Classification Search ............ 455/575.1, 455/575.4, 90.3, 347–349; 379/433.01, 433.12
See application file for complete search history.

(56) References Cited

U.S. PATENT DOCUMENTS

| | | | |
|---|---|---|---|
| 7,158,818 B2* | 1/2007 | Lee | 455/575.4 |
| 7,181,257 B2* | 2/2007 | Gordecki | 455/575.4 |
| 7,319,892 B2* | 1/2008 | Kato | 455/575.4 |
| 7,343,182 B2* | 3/2008 | Wu | 455/575.4 |
| 2006/0205450 A1* | 9/2006 | Amano et al. | 455/575.4 |
| 2007/0060220 A1* | 3/2007 | Hsu | 455/575.4 |
| 2007/0155448 A1* | 7/2007 | Hong | 455/575.4 |
| 2007/0155451 A1* | 7/2007 | Lee | 455/575.4 |
| 2007/0218963 A1* | 9/2007 | Kim | 455/575.4 |
| 2008/0058039 A1* | 3/2008 | Lee et al. | 455/575.4 |
| 2008/0207284 A1* | 8/2008 | Jung et al. | 455/575.4 |

FOREIGN PATENT DOCUMENTS

| | | |
|---|---|---|
| EP | 0 939 533 | 9/1999 |
| EP | 1 150 476 | 10/2001 |
| WO | 2006/031078 | 3/2006 |

OTHER PUBLICATIONS

Nokia 6270 Data Sheet.
Nokia 6280 Data Sheet.
Nokia 8800 Data Sheet.
Nokia N80 Data Sheet.

* cited by examiner

*Primary Examiner*—Simon D Nguyen

(57) ABSTRACT

The invention relates to an sliding mechanism, and in particular an electronic device sliding mechanism. The invention provides an electronic device sliding mechanism comprising a first part and a second part, the first and second parts being slidably movable relative to one another between a first configuration and a second configuration; a bias assembly arranged to bias the first and second parts towards the first configuration; an actuating mechanism arrangeable to act against the bias of the bias assembly, the actuating mechanism including a resilient element and a user-operable element, the actuating mechanism being arranged to cause deformation of the resilient element by acting against the resilience of the resilient element, to store resilient energy therein upon actuation of the user-operable element, the sliding mechanism being arranged such that, upon actuation of the user-operable element, the resilient element is deformed to store increased levels of resilient energy, the level of stored resilient energy increasing to a level to act against the bias of the bias assembly to move the first and second parts away from the first configuration to the second configuration.

10 Claims, 7 Drawing Sheets

ELECTRONIC DEVICE SLIDING MECHANISM

The invention relates to a sliding mechanism and in particular to a sliding mechanism for an electronic device. Although specific embodiments may relate to a sliding mechanism for handheld electronic devices comprising radiotelephone functionality, other embodiments may not include radiotelephone functionality. Electronic devices may alternatively or additionally include audio/still image/video recording/playing functionality.

BACKGROUND OF THE INVENTION

Electronic devices, particularly user-portable radiotelephones (e.g. mobile cellular phones), often comprise two separate parts which can be slid between an open configuration in which a keypad, display and/or other user interface elements (including one or more connectivity ports e.g. USB ports) can be accessed and a closed configuration in which the keypad/display and/or other user interface elements are not accessible. More generally, sliding mechanisms for electronic devices allow a compact design facilitating user portability and may not necessarily hide user interface elements in the closed configuration.

SUMMARY OF THE INVENTION

According to the invention, there is provided an electronic device sliding mechanism comprising
  a first part and a second part, the first and second parts being slidably movable relative to one another between a first configuration and a second configuration;
  a bias assembly arranged to bias the first and second parts towards the first configuration;
  an actuating mechanism arrangeable to act against the bias of the bias assembly, the actuating mechanism including a resilient element and a user-operable element, the actuating mechanism being arranged to cause deformation of the resilient element by acting against the resilience of the resilient element, to store resilient energy therein upon actuation of the user-operable element, the sliding mechanism being arranged such that, upon actuation of the user-operable element, the resilient element is deformed to store increased levels of resilient energy, the level of stored resilient energy increasing to a level to act against the bias of the bias assembly to move the first and second parts away from the first configuration to the second configuration.

In a first embodiment, the bias assembly is a first bias assembly, the sliding mechanism further including
  a second bias assembly arranged to bias the first and second parts towards the second configuration, the first and second bias assemblies being arranged such that the first and second configurations are bistable configurations of the mechanism.

In the first embodiment, the resilient element may be a first resilient element, and the sliding mechanism may further include
  a second resilient element, the actuating mechanism being arranged to cause deformation of the second resilient element by acting against the resilience of the second resilient element, to store resilient energy therein upon actuation of the user-operable element, the sliding mechanism being arranged such that, upon actuation of the user-operable element, the second resilient element is deformed to store increased levels of resilient energy, the level of stored resilient energy increasing to a level to act against the bias of the second bias assembly to move the first and second parts away from the second configuration to the first configuration.

The bias assembly or first bias assembly may include a first magnetic element attached to the first part and a second magnetic element attached the second part, the magnetic elements being arranged to attract one another. Similarly, the second bias assembly may include a third magnetic element attached to the first part and a fourth magnetic element attached the second part, the magnetic elements being arranged to attract one another.

The user-operable element may include a slidably movable element having an end portion, the resilient element being fixedly attached to the end portion and arranged between the end portion and the first part, such that movement of the slidably movable element when in the first configuration compresses the resilient element against the first part to cause said deformation.

According to a second aspect, the present invention provides an electronic device comprising the sliding mechanism according to the first aspect.

According to a third aspect, the present invention provides an electronic device sliding mechanism comprising
  a first part and a second part, the first and second parts being slidably movable relative to one another between a first configuration and a second configuration;
  a means for biasing arranged to bias the first and second parts towards the first configuration;
  a means for actuating arrangeable to act against the bias of the means for biasing, the means for actuating including a means for storing resilient energy and a means for user-operation, the means for actuating being arranged to cause deformation of the means for storing resilient energy by acting against the resilience of the means for storing resilient energy, to store resilient energy therein upon actuation of the means for user-operation, the sliding mechanism being arranged such that, upon actuation of the means for user-operation, the means for storing resilient energy is deformed to store increased levels of resilient energy, the level of stored resilient energy increasing to a level to act against the bias of the means for biasing to move the first and second parts away from the first configuration to the second configuration.

According to a fourth aspect, the present invention provides a electronic device comprising the sliding mechanism according to the third aspect.

One or more aspects and/or embodiments and/or features from one or more aspects/embodiments in isolation or in various combinations are within the scope of the present disclosure whether or not specifically mentioned in isolation or that combination.

BRIEF DESCRIPTION OF THE DRAWINGS

In order that the invention may more readily be understood, a description is now given, by way of example only, reference being made to the accompanying drawings, in which.

DETAILED DESCRIPTION OF THE INVENTION

Figure 1:
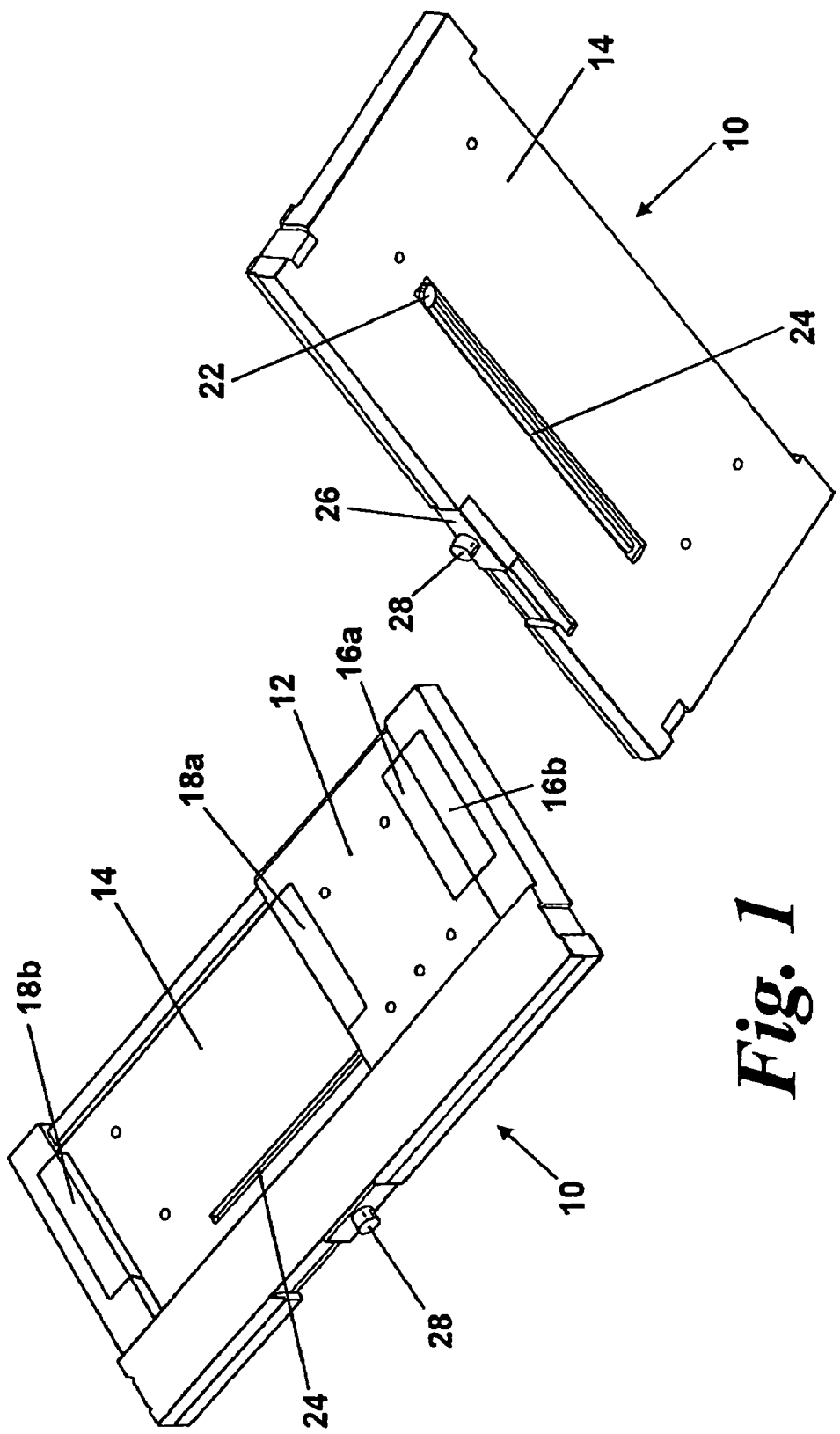
FIG. 1 shows perspective views from above and below an electronic device sliding mechanism according to the invention.

FIG. 1 shows an electronic device sliding mechanism 10 according to one embodiment of the invention.

In this case, the sliding mechanism 10 is intended for use with a handheld electronic device, such as a user-portable radiotelephone (e.g. a mobile cellular phone), and includes a first part 12 and a second part 14, a first bias assembly 16 comprising first and second magnetic elements 16a and 16b, a second bias assembly 18 comprising third and fourth magnetic elements 18a and 18b, and an actuating mechanism 20. In this embodiment, the magnetic elements are permanent magnets. In other embodiments, the biasing may be provided by electromagnetic elements. The biasing may be provided by electrostatic/magnetic coatings applied to respective surfaces. The bias assembly may be protected by an overlying metal cover 60.

For ease of understanding, the following description includes relative terms such as "upper" and "lower", but it is to be understood that the function of the sliding mechanism 10 is not necessarily limited to upper and lower orientations of the device.

Figure 2:
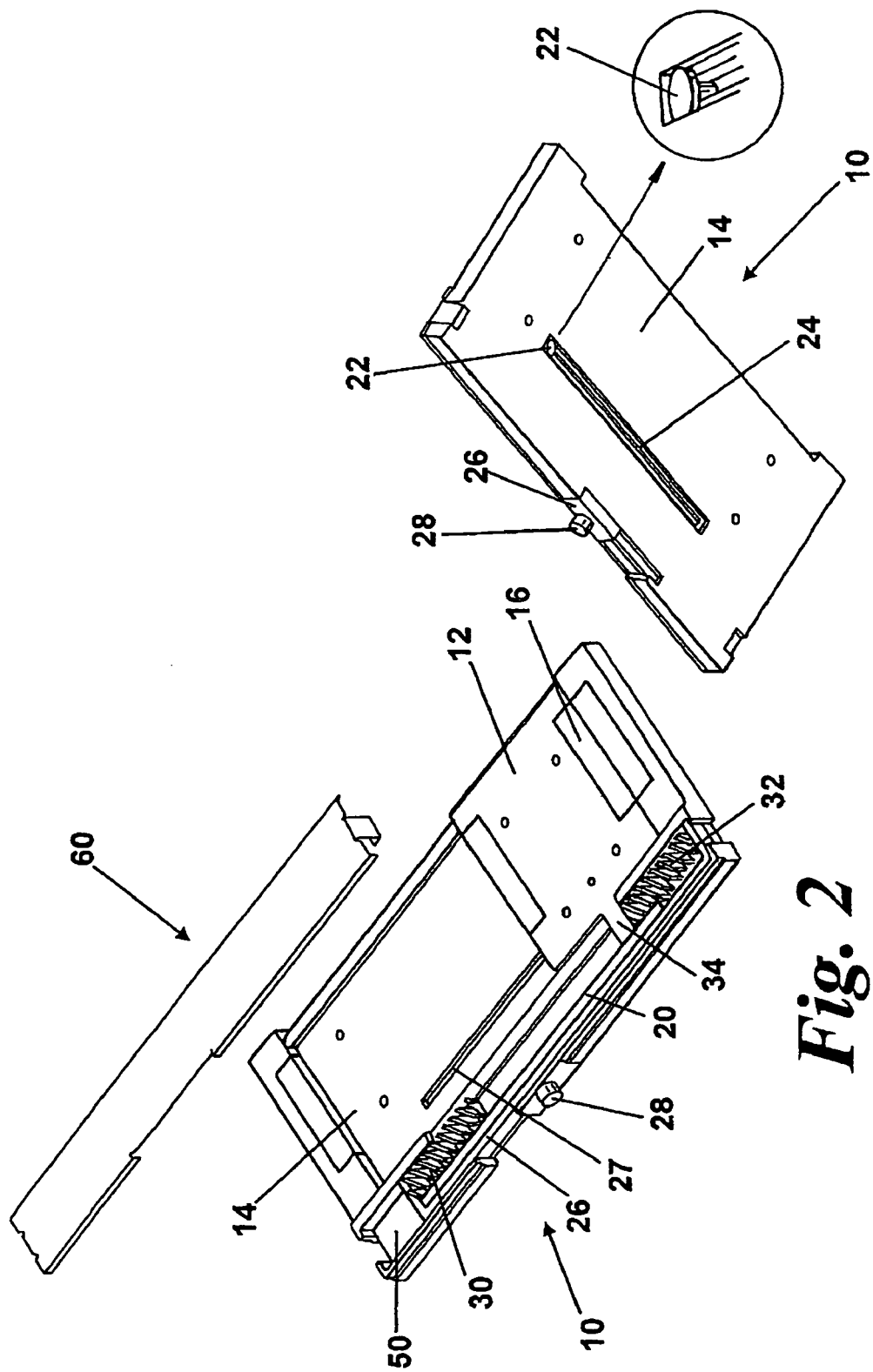
FIG. 2 is a partially exploded view of the sliding mechanism of FIG. 1.
Figure 3:
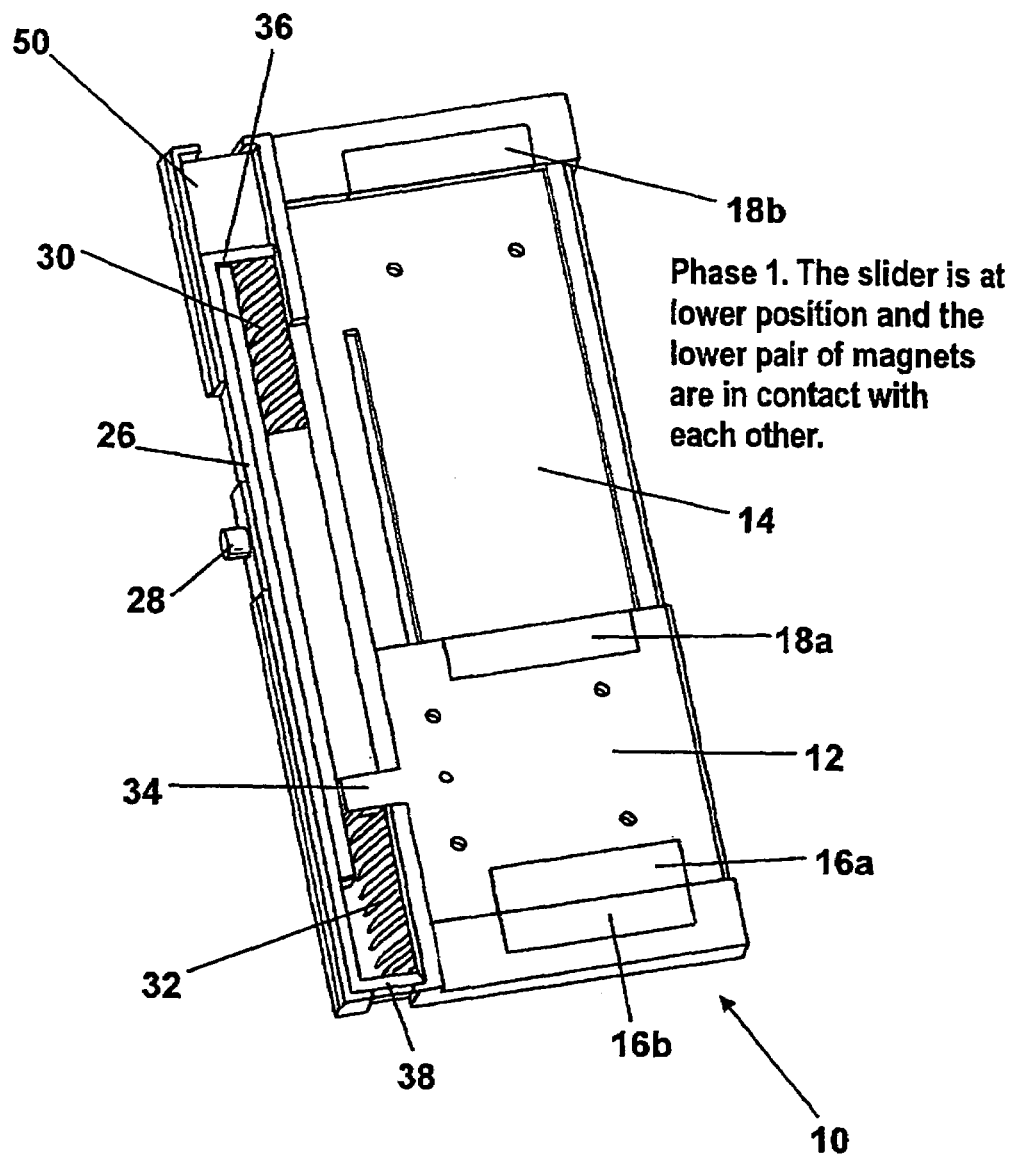
FIGS. 3 to 6 show the sliding mechanism of FIG. 1 at sequential points during operation of the mechanism.
Figure 6:
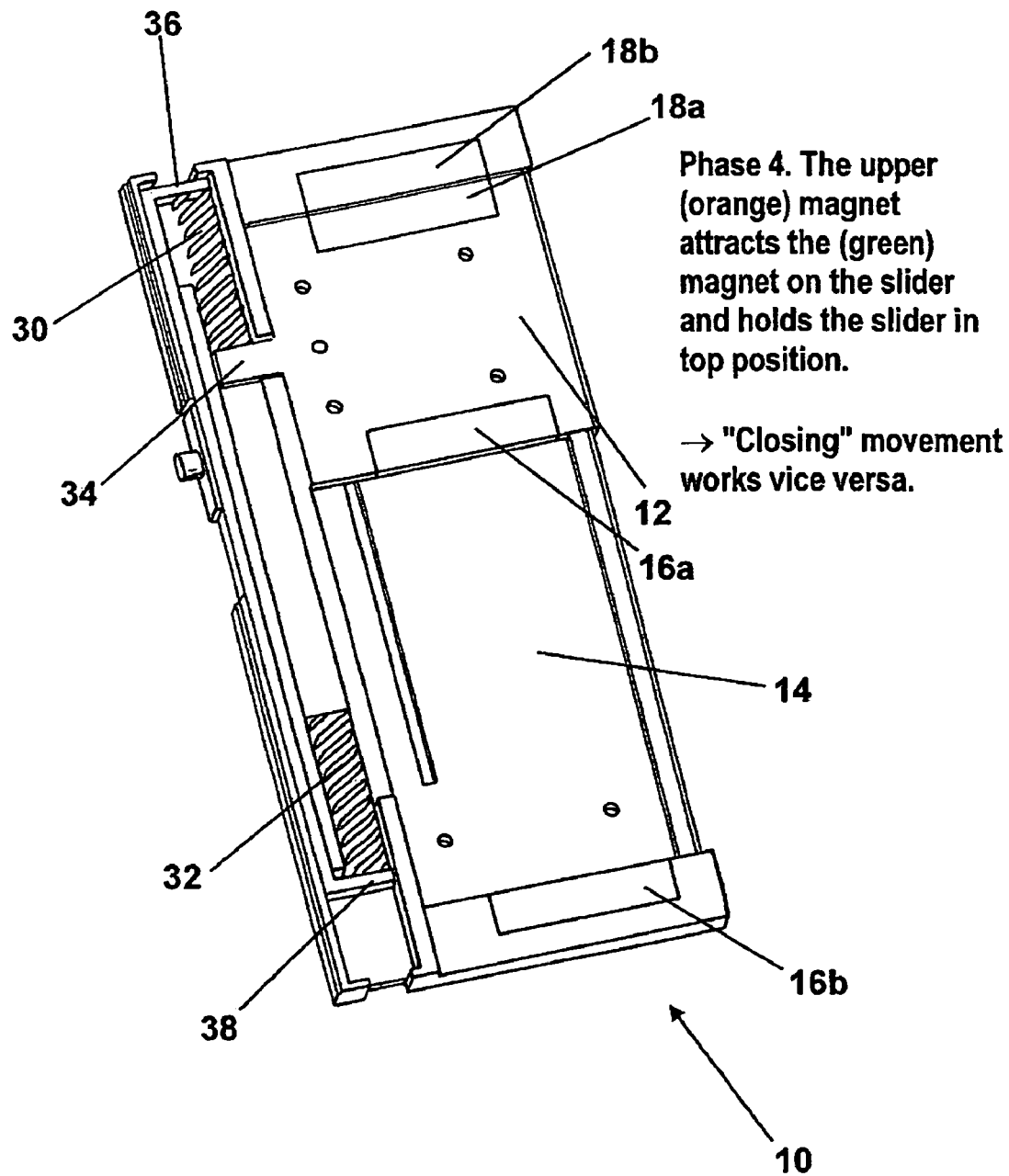
Figure 7:
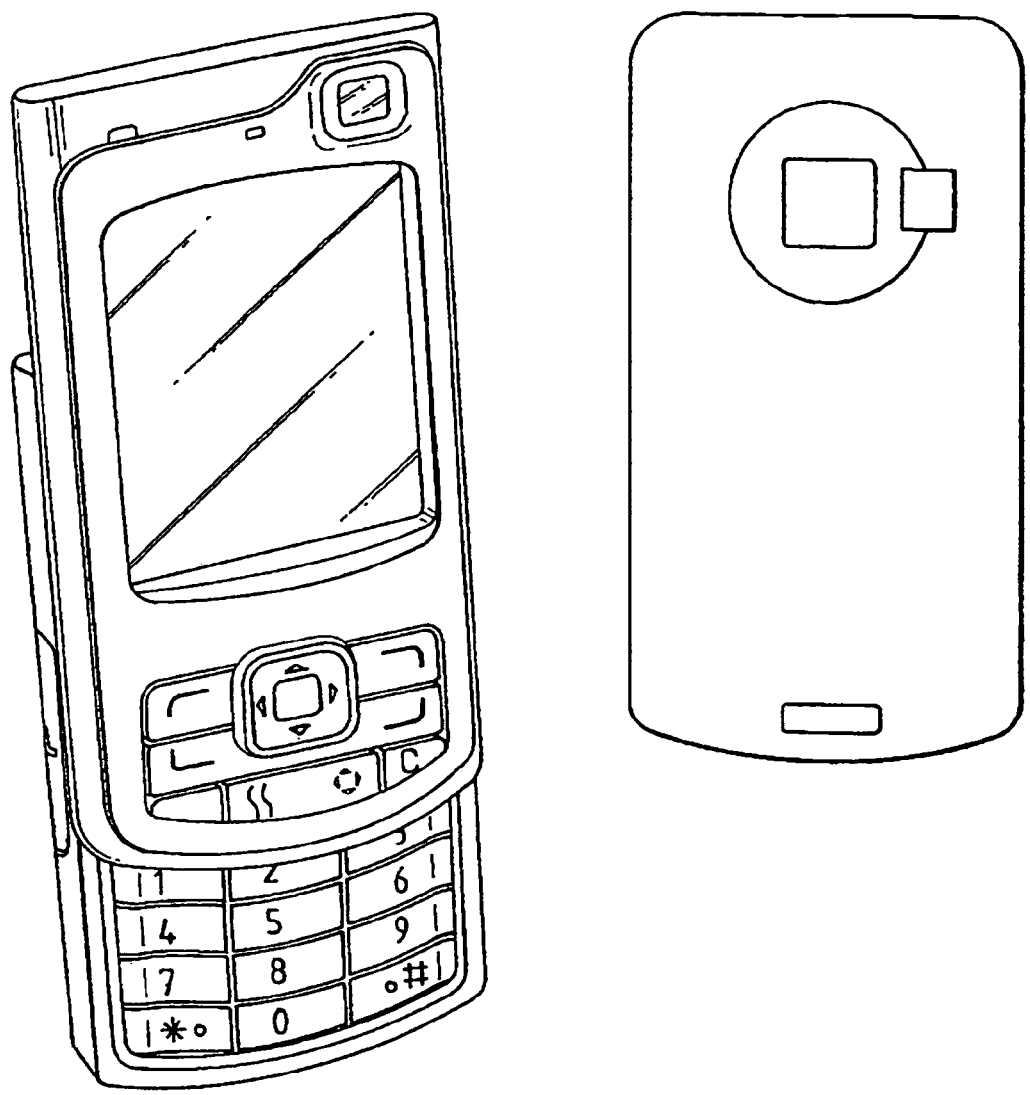
FIG. 7 shows a typical electronic device in which the sliding mechanism of FIG. 1 may be incorporated.

The first part 12 includes a clip 22 which cooperates with a slot 24 in the second part 14 to enable the first part 12 to be slidably movable relative to the second part 14 between a first configuration, shown in FIG. 3, and a second configuration, shown in FIG. 6. In the first configuration, the first part 12 is positioned adjacent the lower end of the second part 14 and, in the second configuration, the first part 12 is positioned adjacent the upper end of the second part 14. As seen in FIG. 2, the first part 12 includes an arm 34, which will be described below with reference to the actuating mechanism 20.

The first magnetic element 16a is positioned at the lower end of the first part 12 while the second magnetic element 16b is positioned at the lower end of the second part 14. The first and second magnetic elements 16a, 16b are arranged to attract one another and thus form the first bias assembly 16 to bias the first and second parts 12, 14 towards the first configuration. The third magnetic element 18a is positioned at the upper end of the first part 12 while the fourth magnetic element 18b is positioned at the upper end of the second part 14. The third and fourth magnetic elements 18a, 18b are arranged to attract one another and thus form the second bias assembly 18 to bias the first and second parts 12, 14 towards the second configuration. In this way, the first and second configurations are bistable configurations of the sliding mechanism 10.

The actuating mechanism 20 is best seen in FIG. 2 and includes a user-operable element 26 (in the form of a slidable element 26) having an actuator button 28, and also includes upper and lower resilient elements 30, 32, which in this embodiment are upper and lower springs 30, 32. The sliding element 26 is user actuatable by the actuator button 28 between a lower position (FIG. 3) and an upper position relative (FIG. 4) to the second part 14. A cavity 50 is formed at respective upper and lower end to allow the sliding element to move into the lower and upper positions.

The sliding element 26 includes upper and lower end portions 36, 38 arranged perpendicularly to its direction of travel. The upper and lower springs 30, 32 are attached to respective upper and lower end portions 36, 38 and are arranged to oppose one another. The arm 34 of the first part 12 is positioned between the end portions 36, 38 and springs 30, 32.

The operation of the sliding mechanism will now be described with reference to FIGS. 3 to 6.

In FIG. 3, the first and second parts 12, 14 are in the first configuration and the sliding element 26 is in the lower position. The lower spring 32 abuts both the arm 34 and the lower end portion 38 and is uncompressed thereby. In other embodiments there may be a (e.g. modest) degree of compression applied to the spring 32 in this configuration. The first and second magnetic elements 16a, 16b of the first bias assembly 16 attract one another and thereby exert a retention force on the first part 12, which force biases the first and second parts 12, 14 towards the first configuration.

Figure 4:
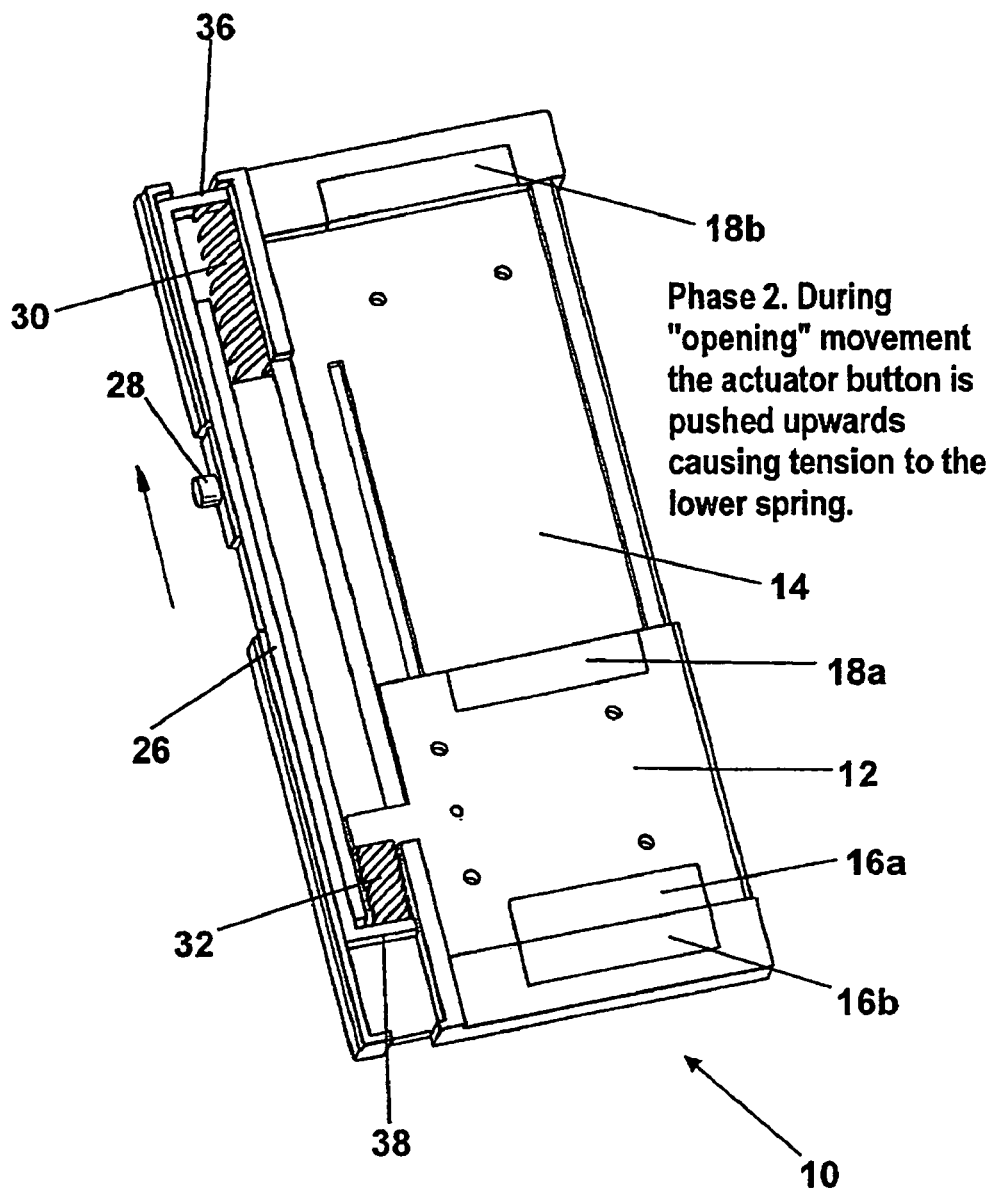
Figure 5:
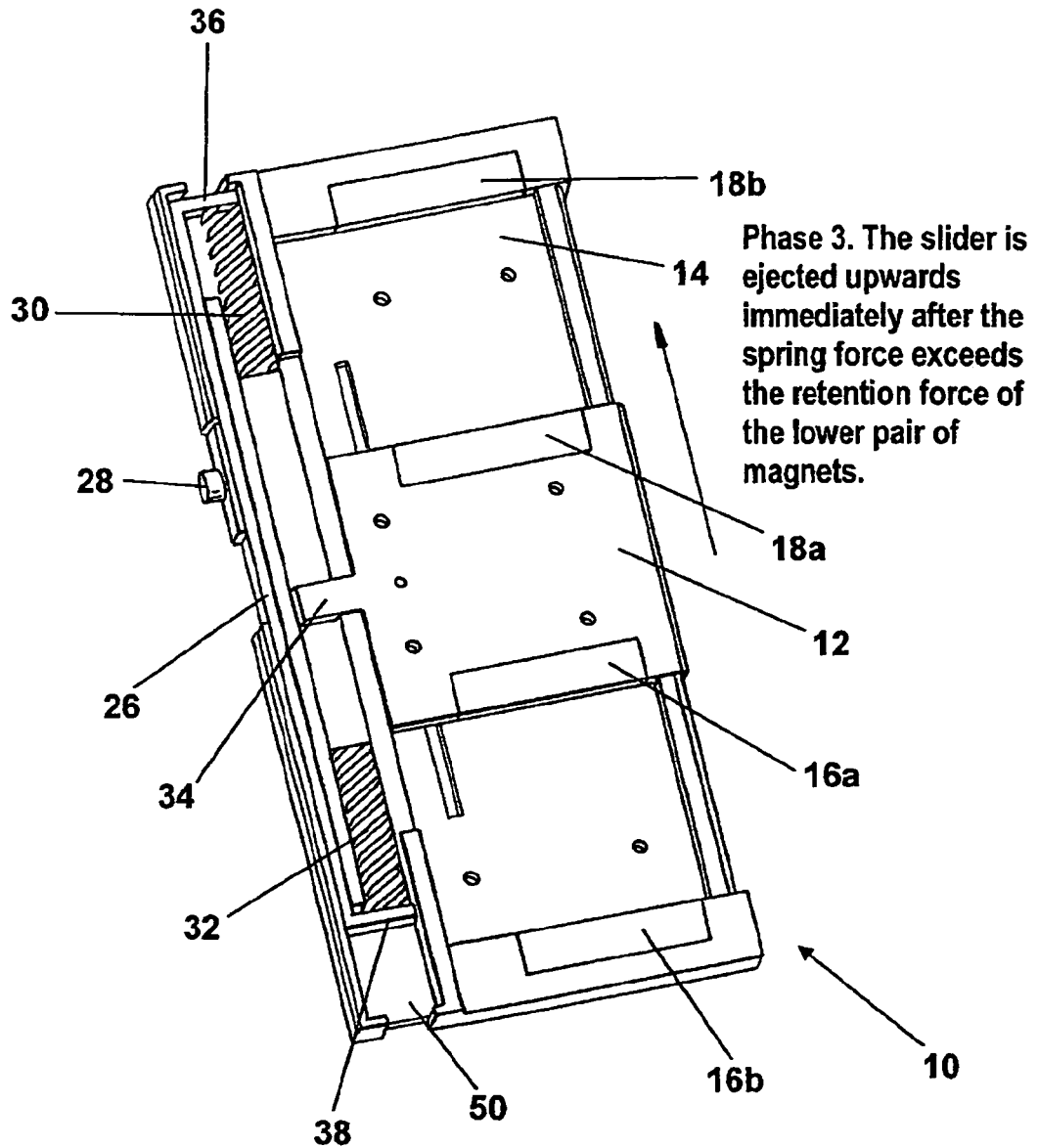

As seen in FIG. 4, operation of the actuator button 28 to move the sliding element 26 to the upper position causes the lower spring 32 to become compressed between the lower end portion 38 and the arm 34 of the first part 12. Such compression results in the lower spring 32 exerting a force on the first part 12 (via the arm 34), which force acts against the bias of the first bias assembly 16 and tends to move the first and second parts 12, 14 to the second configuration. During such compression, the force exerted on the first part 12 by lower spring 32 increases until it reaches a level at which it exceeds that exerted on the first part 12 by the first bias assembly 16, at which point the first part 12 moves towards the second configuration, as shown in FIG. 5.

The momentum of the first part 12 carries it towards the second configuration. After the first part 12 reaches the midpoint of its travel, the force exerted by the second bias assembly 18 on the first part 12 assists the movement into the second configuration.

In FIG. 6, the first and second parts 12, 14 are in the second configuration and the sliding element 26 is in the upper position. The upper spring 30 abuts both the arm 34 and the upper end portion 36 and is uncompressed thereby. In other embodiments there may be a (e.g. modest) degree of compression applied to the spring 30 in this configuration. The third and fourth magnetic elements 18a, 18b of the second bias assembly 18 attract one another and thereby exert a retention force on the first part 12, which force biases the first and second parts 12, 14 towards the second configuration.

In the opposite way to that described with reference to FIG. 4, operation of the actuator button 28 to move the sliding element 26 to the lower position causes the upper spring 30 to become compressed between the upper end portion 36 and the arm 34 of the first part 12. Such compression results in the upper spring 30 exerting a force on the first part 12 (via the arm 34), which force acts against the bias of the second bias assembly 18 and tends to move the first and second parts 12, 14 to the first configuration. During such compression, the force exerted on the first part 12 by upper spring 30 increases until it reaches a level at which it exceeds that exerted on the first part 12 by the second bias assembly 18, at which point the first part 12 moves towards the first configuration.

The momentum of the first part 12 carries it towards the first configuration. After the first part 12 reaches the midpoint of its travel, the force exerted by the first bias assembly 16 on the first part 12 assists the movement into the first configuration.

In the above description, the resilient elements or springs are described as being deformed by compression. Any elastically deformable resilient elements are within the scope of the invention. In a variant, the resilient elements, may be resiliently deformable elastic elements which bend when compressive forces are applied and straighten to release compressive forces. It will be appreciated that the resilient elements releasably store energy under compression/tension which is released with the compression/tension is removed.

The first part 12 may be attachable to an electronic device housing comprising a display and the second part 14 to an electronic device housing comprising one or more user input elements (including a keypad).

Although the respective magnetic/resilient elements are each shown to comprise a single member (i.e. a single magnet/spring) it will be appreciated that each magnetic/resilient element may comprise more than member (i.e. more than one magnet/spring). Various types of different magnets/springs can be used in combination. Although helical springs are shown in the figures, spiral springs or any suitable springs may be used.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may comprise any such individual feature or combination of features. In view of the foregoing description it will be evident to a person skilled in the art that various modifications may be made within the scope of the invention.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An electronic device sliding mechanism comprising
   a first part and a second part, the first and second parts slidably movable relative to one another between a first configuration and a second configuration;
   a bias assembly arranged to bias the first and second parts towards the first configuration;
   an actuating mechanism arrangeable to act against the bias of the bias assembly, the actuating mechanism including a resilient element and a user-operable element, the actuating mechanism arranged to cause deformation of the resilient element by acting against resilience of the resilient element, to store resilient energy therein upon actuation of the user-operable element, the sliding mechanism arranged such that, upon actuation of the user-operable element, the resilient element is deformed to store increased levels of resilient energy, the level of stored resilient energy increasing to a level to act against the bias of the bias assembly to move the first and second parts away from the first configuration to the second configuration.

2. The sliding mechanism of claim 1 wherein the bias assembly is a first bias assembly, the sliding mechanism further including
   a second bias assembly arranged to bias the first and second parts towards the second configuration, the first and second bias assemblies being arranged such that the first and second configurations are bistable configurations of the mechanism.

3. The sliding mechanism of claim 2 wherein the resilient element is a first resilient element, the sliding mechanism further including
   a second resilient element, the actuating mechanism being arranged to cause deformation of the second resilient element by acting against resilience of the second resilient element, to store resilient energy therein upon actuation of the user-operable element, the sliding mechanism being arranged such that, upon actuation of the user-operable element, the second resilient element is deformed to store increased levels of resilient energy, the level of stored resilient energy increasing to a level to act against the bias of the second bias assembly to move the first and second parts away from the second configuration to the first configuration.

4. The sliding mechanism of claim 1 wherein the bias assembly includes a first magnetic element attached to the first part and a second magnetic element attached the second part, the magnetic elements being arranged to attract one another.

5. The sliding mechanism of claim 1 wherein the user-operable element includes a slidably movable element having an end portion, the resilient element being fixedly attached to the end portion and arranged between the end portion and the first part, such that movement of the slidably movable element when in the first configuration compresses the resilient element against the first part to cause said deformation.

6. An electronic device comprising the sliding mechanism of claim 1.

7. An electronic device sliding mechanism comprising
   a first part and a second part, the first and second parts being slidably movable relative to one another between a first configuration and a second configuration;
   a means for biasing arranged to bias the first and second parts towards the first configuration;
   a means for actuating arrangeable to act against the bias of the means for biasing, the means for actuating including a means for storing resilient energy and a means for user-operation, the means for actuating being arranged to cause deformation of the means for storing resilient energy by acting against the resilience of the means for storing resilient energy, to store resilient energy therein upon actuation of the means for user-operation, the sliding mechanism being arranged such that, upon actuation of the means for user-operation, the means for storing resilient energy is deformed to store increased levels of resilient energy, the level of stored resilient energy increasing to a level to act against the bias of the means for biasing to move the first and second parts away from the first configuration to the second configuration.

8. An electronic device comprising the sliding mechanism of claim 7.

9. Method, comprising:

slideably moving a first part relative to a second part between a first configuration and a second configuration of a sliding mechanism in response to actuating of an actuating mechanism arranged for action against a bias of a bias assembly for biasing the first and second parts towards the first configuration, said actuating mechanism including a resilient element and a user-operable element, the actuating mechanism arranged to cause deformation of the resilient element by acting against resilience of the resilient element, to store resilient energy therein upon actuation of the user-operable element, the sliding mechanism arranged such that, upon actuation of the user-operable element, the resilient element is deformed to store increased levels of resilient energy, the level of stored resilient energy increasing to a level to act against the bias of the bias assembly to move the first and second parts away from the first configuration to the second configuration.

10. Apparatus, comprising:

means for slideably moving a first part relative to a second part between a first configuration and a second configuration of a sliding mechanism in response to actuation of means for actuating arranged for action against a bias of a bias assembly for biasing the first and second parts towards the first configuration, said actuating mechanism including a resilient element and a user-operable element, the actuating mechanism arranged to cause deformation of the resilient element by acting against resilience of the resilient element, to store resilient energy therein upon actuation of the user-operable element, the sliding mechanism arranged such that, upon actuation of the user-operable element, the resilient element is deformed to store increased levels of resilient energy, the level of stored resilient energy increasing to a level to act against the bias of the bias assembly to move the first and second parts away from the first configuration to the second configuration.

* * * * *